United States Patent
Wang et al.

(10) Patent No.: US 11,042,577 B2
(45) Date of Patent: Jun. 22, 2021

(54) QUESTION AND ANSWER INTERFACE BASED ON CONTEXTUAL INFORMATION

(71) Applicant: Google LLC, Mountain View, CA (US)

(72) Inventors: Weizhao Wang, Sunnyvale, CA (US); Monica Priya Garde, San Francisco, CA (US); Justin Min, Menlo Park, CA (US); Jiarui Li, Palo Alto, CA (US); Eyal Segalis, Tel Aviv (IL); Daniel Walevski, Brooklyn, NY (US); Yaniv Leviathan, New York, NY (US); Matthew Streit Coursen, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 32 days.

(21) Appl. No.: 16/398,410

(22) Filed: Apr. 30, 2019

(65) Prior Publication Data
US 2019/0258658 A1    Aug. 22, 2019

Related U.S. Application Data

(63) Continuation of application No. 15/073,082, filed on Mar. 17, 2016, now Pat. No. 10,289,729.

(51) Int. Cl.
*G06F 16/332* (2019.01)
*G06F 16/338* (2019.01)
(Continued)

(52) U.S. Cl.
CPC ........ *G06F 16/3329* (2019.01); *G06F 16/335* (2019.01); *G06F 16/338* (2019.01);
(Continued)

(58) Field of Classification Search
CPC ............. G06F 16/3329; G06F 16/3344; G06F 16/338; G06F 16/9535; G06F 16/335; G06F 16/9537; G09B 7/06
(Continued)

(56) References Cited

U.S. PATENT DOCUMENTS 7,487,145 B1   2/2009 Gibbs
2003/0101153 A1   5/2003 Francis et al.
(Continued)

FOREIGN PATENT DOCUMENTS

JP   2004-102818   4/2004
JP   2006-039881   2/2006
(Continued)

OTHER PUBLICATIONS

EP Office Action in European Application No. 16820046.7, dated Apr. 16, 2020, 9 pages.
(Continued)

*Primary Examiner* — Evan Aspinwall
(74) *Attorney, Agent, or Firm* — Brake Hughes Bellermann LLP

(57) ABSTRACT

Methods, systems, and apparatus, including computer programs encoded on a computer storage medium, for receiving data identifying contexts; selecting an initial set of questions based at least on the contexts; providing a respective representation of the questions of the initial set, for output; receiving data indicating a selection of a particular representation associated with a particular question of the initial set of questions; selecting a set of answers associated with the particular question; providing a respective representation of the answers of the set that are associated with the particular question, for output; receiving data indicating a selection of a particular representation associated with a particular answer of the set that are associated with the particular question; determining that an additional set of other questions is associated with the particular answer; and in response to the determining, providing a respective representation of the other questions of the additional set, for output.

16 Claims, 7 Drawing Sheets

(51) Int. Cl.
  *G06F 16/33* (2019.01)
  *G06F 16/335* (2019.01)
  *G06F 16/9537* (2019.01)
  *G06F 16/9535* (2019.01)
  *G09B 7/06* (2006.01)

(52) U.S. Cl.
  CPC ...... *G06F 16/3344* (2019.01); *G06F 16/9535* (2019.01); *G06F 16/9537* (2019.01); *G09B 7/06* (2013.01)

(58) Field of Classification Search
  USPC .......................................... 707/727
  See application file for complete search history.

(56) References Cited

U.S. PATENT DOCUMENTS

| | | |
|---|---|---|
| 2005/0283468 A1 | 12/2005 | Kannvar |
| 2008/0005067 A1 | 1/2008 | Dumais |
| 2008/0103936 A1* | 5/2008 | Churlik ................. G06Q 30/02 705/26.41 |
| 2009/0248659 A1 | 10/2009 | McCool et al. |
| 2010/0076978 A1 | 3/2010 | Cong et al. |
| 2010/0228710 A1 | 9/2010 | Innig |
| 2011/0055189 A1 | 3/2011 | Effrat |
| 2011/0078192 A1 | 3/2011 | Murdock, IV |
| 2011/0307478 A1* | 12/2011 | Pinckney ................. G09B 7/04 707/724 |
| 2013/0046777 A1 | 2/2013 | Mohiuddin |
| 2013/0185081 A1 | 7/2013 | Cheyer et al. |
| 2015/0347587 A1 | 12/2015 | Allen |
| 2016/0019280 A1 | 1/2016 | Unger et al. |
| 2016/0026629 A1 | 1/2016 | Clifford et al. |
| 2016/0154799 A1* | 6/2016 | Allen .................... G06F 16/335 707/728 |

FOREIGN PATENT DOCUMENTS

| | | |
|---|---|---|
| JP | 2007-249899 | 9/2007 |
| JP | 2013-054406 | 3/2013 |
| JP | 2015-056014 | 3/2015 |
| RU | 105759 | 6/2011 |
| WO | WO 2015/181814 | 12/2015 |

OTHER PUBLICATIONS

RU Decision on Grant in Russian Application No. 2018121613, dated Aug. 28, 2019, 27 pages.
International Search Report and Written Opinion issued in International Application No. PCT/US2016/064217, dated Mar. 2, 2017, 14 pages.
Written Opinion issued in International Application No. PCT/US2016/064217, dated Mar. 29, 2018, 8 pages.
International Preliminary Report on Patentability issued in International Application No. PCT/US2016/064217, dated Sep. 27, 2018, 9 pages.
RU Office Action in Russian Application No. 2018121613, dated Jun. 13, 2019, 20 pages.
JP Office Action in Japanese Application No. 2019112831, dated Jul. 6, 2020, 15 pages (with English translation).
Office Action for Japanese Application No. 2019-112831 (with English Translation), dated Jan. 12, 2021, 12 pages.
IN Office Action in Indian Application No. 201847021746, dated Nov. 29, 2020, 7 pages (with English translation).

* cited by examiner

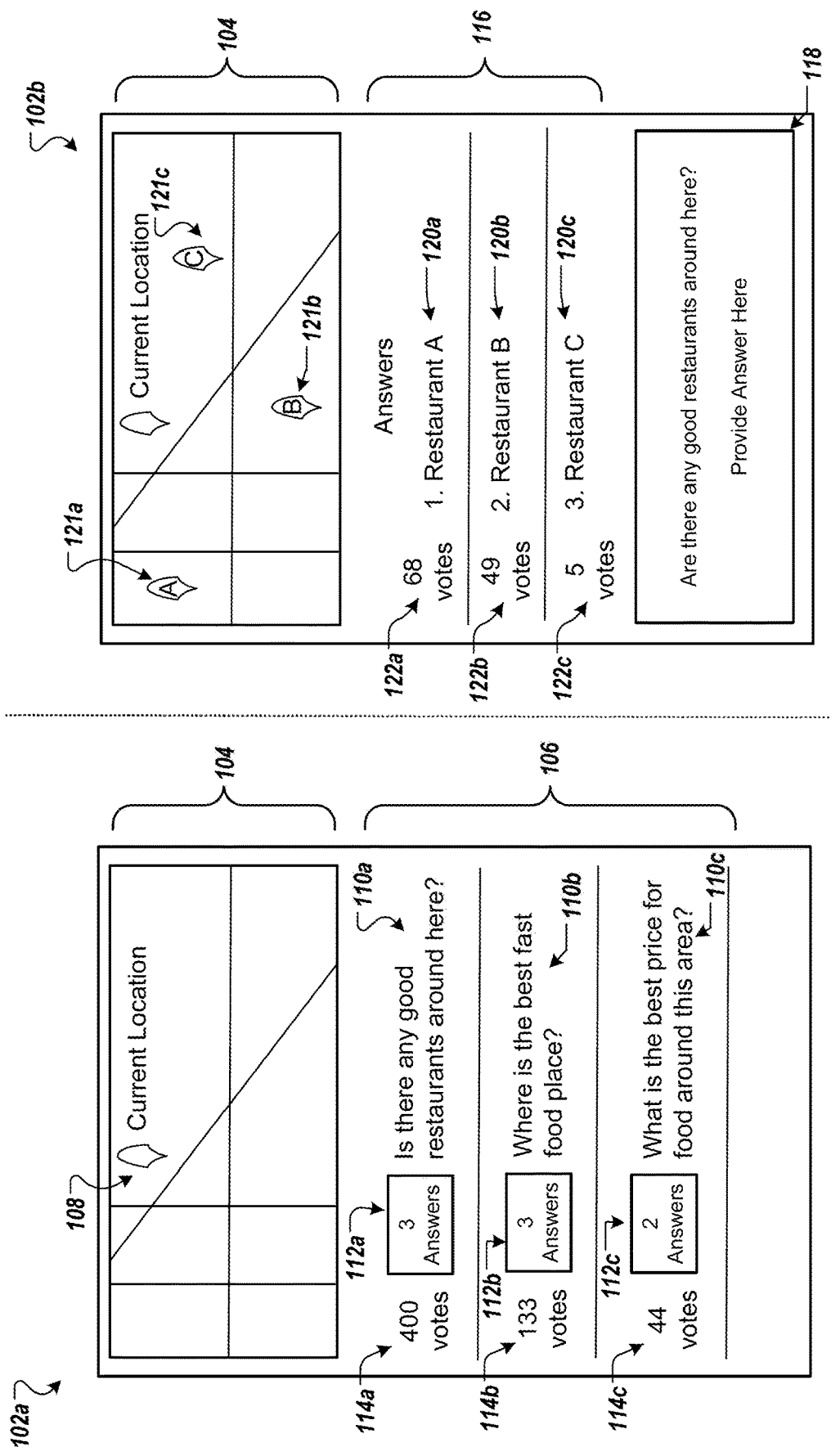

QUESTION AND ANSWER INTERFACE BASED ON CONTEXTUAL INFORMATION

CROSS-REFERENCE TO RELATED APPLICATION

This application is a continuation application of U.S. application Ser. No. 15/073,082, filed Mar. 17, 2016, which is incorporated by reference.

FIELD

The present specification relates to search engines.

BACKGROUND

In general, some users are limited with their ability to generate appropriate search queries, as well as process search results based on the search query. For example, these users may not be tech-savvy and their web experience is limited by a lack of understanding on how to use online tools such as search engines.

SUMMARY

According to some innovative aspects of the subject matter described in this specification, a computing device provides an interface to a user that includes relevant information with minimal interaction by the user by suggesting questions to the user for initiating a search. The interface can include relevant information based on contextual information of the user, such as a location of the user or interests of the user. The user can select a provided question, and in response, the interface is updated to display answers that are associated with the selected question. The user can subsequently select one of the provided answers that in turn is used as a basis for identifying additional questions related to the selected answer. The interface is updated to display the additional questions, and the process repeats iteratively until there are no further associated questions or answers.

In one example implementation, the user launches an application running on a mobile computing device, and the application can initially display an interface including relevant questions to the user based on the location of the user. For example, the user is located in downtown New York City, and the interface can display popular questions for New York City, such as "What are the best sites for New York City" and "What are the best shows to see in New York City." The user can select the question "What are the best sites for New York City," and in turn, the interface is updated to display relevant answers to the question, such as "Empire State Building" and "Times Square." The user can subsequently select "Empire State Building" and the interface is further updated to include additional questions based on the answer "Empire State Building" such as "How tall is the Empire State Building" and "How old is the Empire State Building." The user can select the question "How old is the Empire State Building" and the interface is further updated to include an answer "84 years." Upon selection of the answer "84 years" by the user, it is determined that there are no further questions associated with the answer "84 year." However, the interface can be updated for input of an additional question provided by the user for association with the answer "84 years."

Innovative aspects of the subject matter described in this specification may be embodied in methods that include the actions of receiving data identifying one or more contexts; selecting an initial set of one or more questions based at least on one or more of the contexts; providing a respective representation of one or more of the questions of the initial set, for output; receiving data indicating a selection of a particular representation associated with a particular question of the initial set of questions; selecting a set of one or more answers associated with the particular question; providing a respective representation of one or more of the answers of the set that are associated with the particular question, for output; receiving data indicating a selection of a particular representation associated with a particular answer of the set that are associated with the particular question; determining that an additional set of one or more other questions is associated with the particular answer; and in response to determining that the additional set of one or more other questions is associated with the particular answer, providing a respective representation of one or more of the other questions of the additional set, for output.

Other embodiments of these aspects include corresponding systems, apparatus, and computer programs, configured to perform the actions of the methods, encoded on computer storage devices.

These and other embodiments may each optionally include one or more of the following features. For instance, determining that no other questions are associated with the particular answer; and in response to determining that no other questions are associated with the particular answer: providing, for output, a control for submission of a new question, receiving the new question entered through the control, and storing data associating the new question with the particular answer. The one or more contexts includes a location-based context of a mobile computing device providing the data identifying the one or more contexts. The one or more contexts includes an interest-based context of a user associated with a mobile computing device providing the data identifying the one or more contexts. The one or more of the questions of the initial set are ranked based on a popularity of each of the questions. The one or more of the answers of the set are ranked based on a popularity of each of the answers. Providing the respective representation of one or more of the answers of the set that are associated with the particular question, for output, further includes: providing, for output, a control for submission of a new answer, receiving the new answer entered through the control, and storing data associating the new answer with the particular question.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 1A-1E depict an example presentation page.

DETAILED DESCRIPTION

Figure 1D:
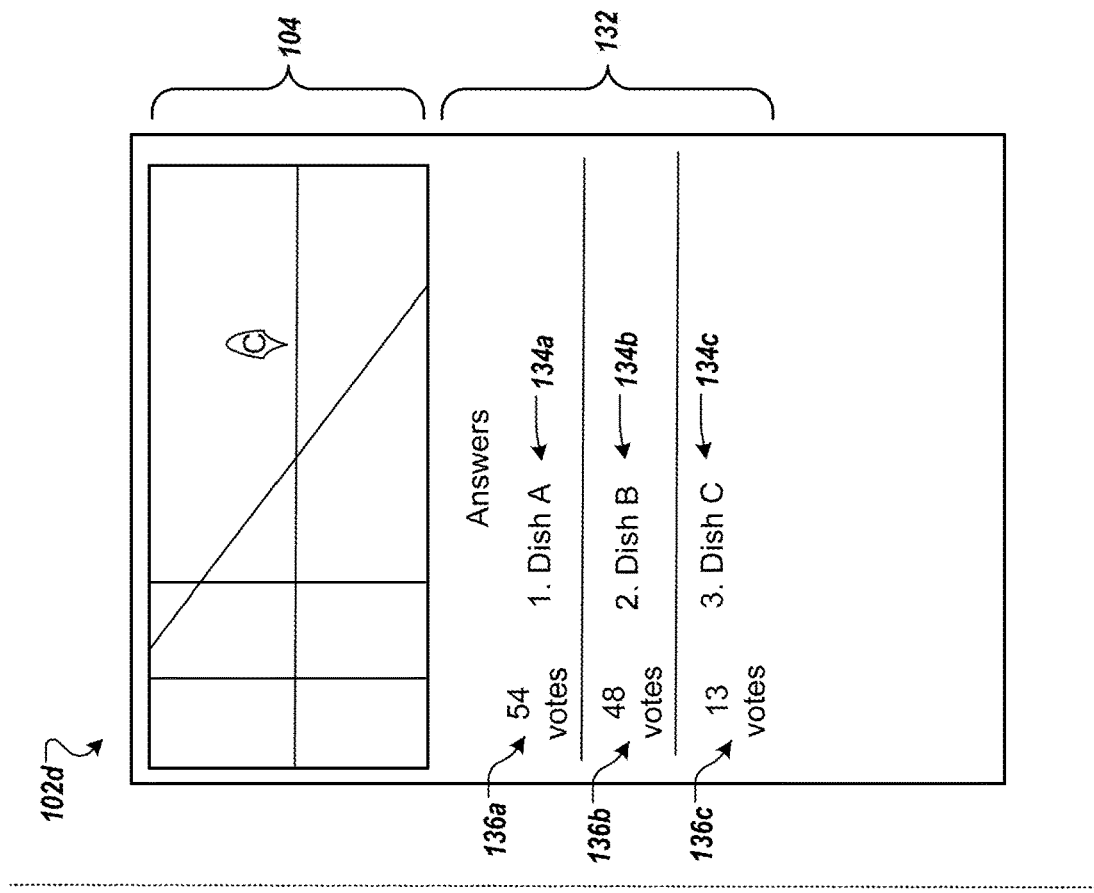

FIG. 1A depicts an example presentation page 102a. In general, the presentation page 102a suggests questions to a user for initiating a search with minimal interaction by the user. Specifically, the presentation page 102a includes a map region 104 and a question region 106. The map region 104 displays a map, and in some examples, is associated with a current location 108 of a mobile computing device providing the presentation page 102a. The question region 106 includes one or more questions associated with one or more parameters of a user of the mobile computing device. In some examples, the question region 106 includes information associated with the current location 108.

In some implementations, the presentation page 102a, and specifically, the question region 106, includes graphical representations of questions 110a, 110b, 110c—collectively referred to as questions 110. The presentation page 102a includes the questions 110 independent of the user manually providing the questions 110, and/or independent of the user providing input to initiate presentation of the questions 110. The presentation page 102a is generated automatically, and includes the questions 110, upon initial execution of an application, e.g., a native application or browser application executing on the mobile computing device providing the presentation page 102a.

In some examples, the questions 110 are associated with a location-based context of the user. For example, the questions 110 are associated with the current location 108 of the user. In some examples, the questions 110 are associated with previously provided queries that have been previously associated with the current location 108 of the user, e.g., questions previously submitted by other users. In the illustrated example, the question 110a is associated with a query "Is there any good restaurants around here?" that is based on the current location 108 of the user. Specifically, the "here" portion of the question 110a refers to the current location 108. Similarly, in the illustrated example, the question 110b is associated with a query "Where is the best fast food place?" that is based on the current location 108; and the question 110c is associated with a query "What is the best price for food around this area?" that is based on the current location 108.

In some examples, the questions 110 are associated with an interest-based context of the user. The interest-based context of the user can be determined from explicit interests indicated by the user, or inferentially determined from an online presence of the user, e.g., a social networking profile. For example, the interest-based context can include such interests as eating preferences, price preferences, and the like.

In the illustrated example, each of the questions 110a, 110b, 110c are associated with respective selectable button 112a, 112b, 112c—collectively referred to as selectable buttons 112. The selectable buttons 112, upon selection by the user, e.g., by tactile input or other, select the respective question 110. Additionally, in some examples, the selectable buttons 112 can visually represent a quantity of answers associated with each question 110, e.g., a number of results associated with the respective question 110. In the illustrated example, the selectable button 112a and the question 110a are associated with three answers; the selectable button 112b and the question 110b are associated with three answers; and the selectable button 112c and the question 110c are associated with two answers.

In some examples, each of the questions 110a, 110b, 110c are associated with respective voting data 114a, 114b, 114c—collectively referred to as voting data 114. The voting data 114 can represent previously submitted votes for the respective question, e.g., previously submitted by other users. In some examples, the voting data 114 can represent a popularity of the respective question, e.g., a higher vote total indicates a higher popularity of the respective question. In the illustrated example, the questions 110 are displayed in the question region 106 based on a ranking of the respective voting data 114. The questions 110 associated with a higher voting data 114, e.g., a higher quantity of votes, are displayed higher in the question region 106 with respect to the remaining questions 110. In the illustrated example, the voting data 114a is associated with 400 votes; the voting data 114b is associated with 133 votes; and the voting data 114c is associated with 44 votes.

FIG. 1B depicts an example presentation page 102b. Specifically, the presentation page 102b is a subsequent version of the presentation page 102a after selection of one of the questions 110 of the presentation page 102a. In response to the selection of one of the questions 110, the presentation page 102a is updated to provide the presentation page 102b. The presentation page includes the map region 104, an answer region 116, and a submission region 118.

In the illustrated example, the presentation page 102b is provided based on the selected question 110a, e.g., "Is there any good restaurants around here?" Specifically, the presentation page 102b, and in particular, the answer region 116, includes graphical representations of answers 120a, 120b, 120c—collectively referred to as answers 120. The answers 120 are associated with the selected question 110a. In some examples, the association can include that the answers 120 are results of a query associated with the selected question 110a. In the illustrated example, the answer 120a is associated "Restaurant A" for the selected question 110a; the answer 120b is associated with "Restaurant B" for the selected question 110a; and the answer 120b is associated with "Restaurant C" for the selected question 110a.

Additionally, after selection of one of the questions 110, the map region 104 is updated based on the selected question 110. In the illustrated example, the map region 104 is updated based on the selected question 110a. Specifically, the map region 104 includes identified locations 121a, 121b, 121c—collectively referred to as locations 121. The locations 121 are associated with the answers 120 for the selected question 110a. For example, the location 121a is associated with the answer 120a; the location 121b is associated with the answer 120b; and the location 121c is associated with the answer 120c.

In some examples, the answers 120 are associated with respective voting data 122a, 122b, 122c—collectively referred to as voting data 122. The voting data 122 can represent previously submitted votes for the respective answer, e.g., previously submitted by other users. In some examples, the voting data 122 can represent a popularity of the respective answer, e.g., a higher vote total indicates a higher popularity of the respective answer. In the illustrated example, the answers 120 are displayed in the answer region 116 based on a ranking of the respective voting data 122. The answers 120 associated with a higher voting data 122, e.g., a higher quantity of votes, are displayed higher in the answer region 116 with respect to the remaining answers 120. In the illustrated example, the voting data 122a is associated with 68 votes; the voting data 122b is associated with 49 votes; and the voting data 122c is associated with five votes.

In some examples, the submission region 118 provides input of an additional answer associated with a selected question 110, e.g., by a user interacting with the presentation page 102b. For example, the answer provided to the submission region 118 can be associated with one of the questions 110. In the illustrated example, an answer provided to the submission region 118 can be associated with the question 110a.

Figure 1C:
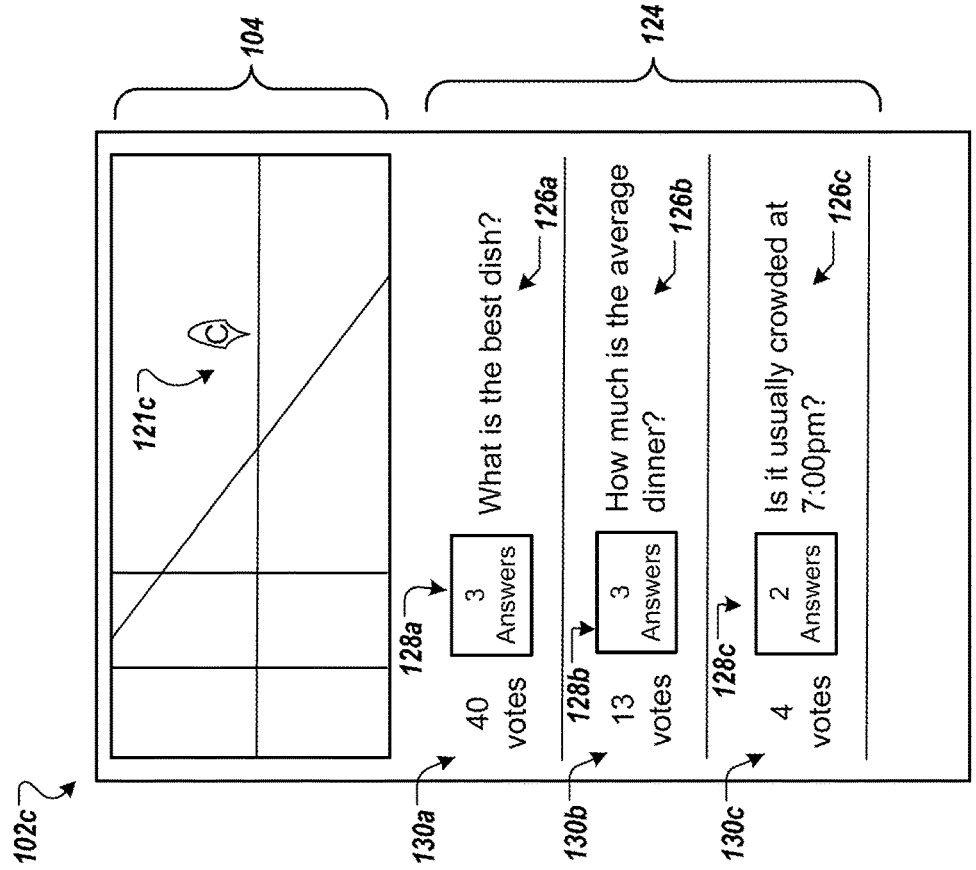

FIG. 1C depicts an example presentation page 102c. Specifically, the presentation page 102c is a subsequent version of the presentation page 102b after selection of one of the answers 120 of the presentation page 102b. In response to the selection of one of the answers 120, the presentation page 120b is updated to provide the presentation page 102c. The presentation page 102c includes the map region 104 and a question region 124.

In the illustrated example, the presentation page 102c is provided based on the selected answer 120c, e.g., "Restaurant C." Specifically, the presentation page 102c, and in particular, the question region 124, includes graphical representations of questions 126a, 126b, 126c—collectively referred to as questions 126. The questions 126 are associated with the selected answer 110c. Specifically, the questions 126 are results stemming from the answer 110c as a query. For example, in response to the selection of the answer 110c, questions 126 are identified as associated with the answer 110c. In the illustrated example, the question 126a "What is the best dish" is associated with "Restaurant C" of the answer 110c; the question 126b "How much is the average dinner" is associated with "Restaurant C" of the answer 110c; and the question 126a "Is it usually crowded at 7:00 pm" is associated with "Restaurant C" of the answer 110c.

In the illustrated example, each of the questions 126a, 126b, 126c are associated with respective selectable buttons 128a, 128b, 128c—collectively referred to as selectable buttons 128. The selectable buttons 128 are similar to the selectable buttons 112 of the presentation page 102a of FIG. 1. In the illustrated example, the selectable button 128a and the question 126a are associated with 3 answers; the selectable button 128b and the question 126b are associated with 3 answers; and the selectable button 128c and the question 126c are associated with 2 answers. Furthermore, in some examples, each of the questions 126a, 126b, 126c are associated with respective voting data 130a, 130b, 130c—collectively referred to as voting data 130. The voting data 130 is similar to the voting data 114 of the presentation page 102a of FIG. 1. In the illustrated example, the voting data 130a is associated with 40 votes; the voting data 130b is associated with thirteen votes; and the voting data 130c is associated with four votes.

Additionally, after selection of one of the answers 120, the map region 104 is updated based on the selected answer 126. In the illustrated example, the map region 104 is updated based on the selected answer 120c. Specifically, the map region 104 includes only the identified location 121c that is associated with the selected answer 120c.

FIG. 1D depicts an example presentation page 102d. Specifically, the presentation page 102d is a subsequent version of the presentation page 102c after selection of one of the questions 126 of the presentation page 102c. In response to the selection of one of the questions 126, the presentation page 102c is updated to provide the presentation page 102d. The presentation page 120d includes the map region 104, and an answer region 132.

In the illustrated example, the presentation page 102d is provided based on the selected question 126a, e.g., "What is the best dish?" Specifically, the presentation page 102d, and in particular, the answer region 132, includes graphical representations of answers 134a, 134b, 134c—collectively referred to as answers 134. The answers 134 are associated with the selected question 126a. In some examples, the association can include that the answers 134 are results of a query associated with the selected question 126a. In the illustrated example, the answer 134a is associated with "Dish A" for the selected question 126a; the answer 134b is associated "Dish B" for the selected question 126a; and the answer 134b is associated with "Dish C" for the selected question 126c.

In some examples, the answers are associated with respective voting data 136a, 136b, 136c—collectively referred to as voting data 136. The voting data 136 can represent previously submitted votes for the respective answer, e.g., previously submitted by other users. The voting data 136 is similar to the voting data 122 of FIG. 1B. In the illustrated example, the voting data 136a is associated with 54 votes; the voting data 136b is associated with 48 votes; and the voting data 136c is associated with thirteen votes.

Figure 1E:
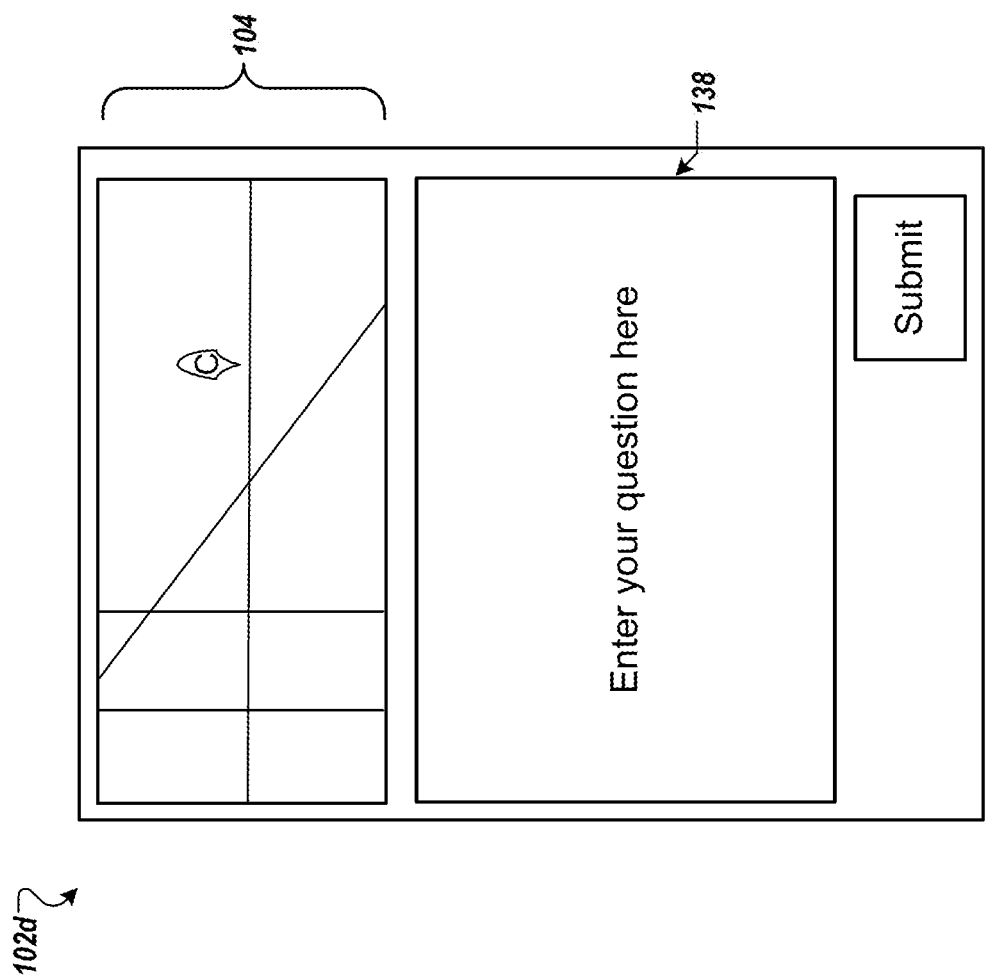

FIG. 1E depicts an example presentation page 102e. Specifically, the presentation page 102e is a subsequent version of the presentation page 102d after selection of one of the answers 134 of the presentation page 102d. In response to the selection of one of the answers 134, the presentation page 120d is updated to provide the presentation page 102e. The presentation page 102e includes the map region 104 and a submission region 138.

In the illustrated example, the presentation page 102e is provided based on the selected answer 136b, e.g., "Dish B." Specifically, the presentation page 102e, and in particular, the submission region 138 provides for input of an additional question associated with the selected answer 136b, e.g., by a user interacting with the presentation page 102e. In some examples, the submission region 138 is provided based on no further questions being associated with the selected answer 136b. Further, the question provided to the submission region 138 can be associated with the selected answer 136b.

Figure 2:
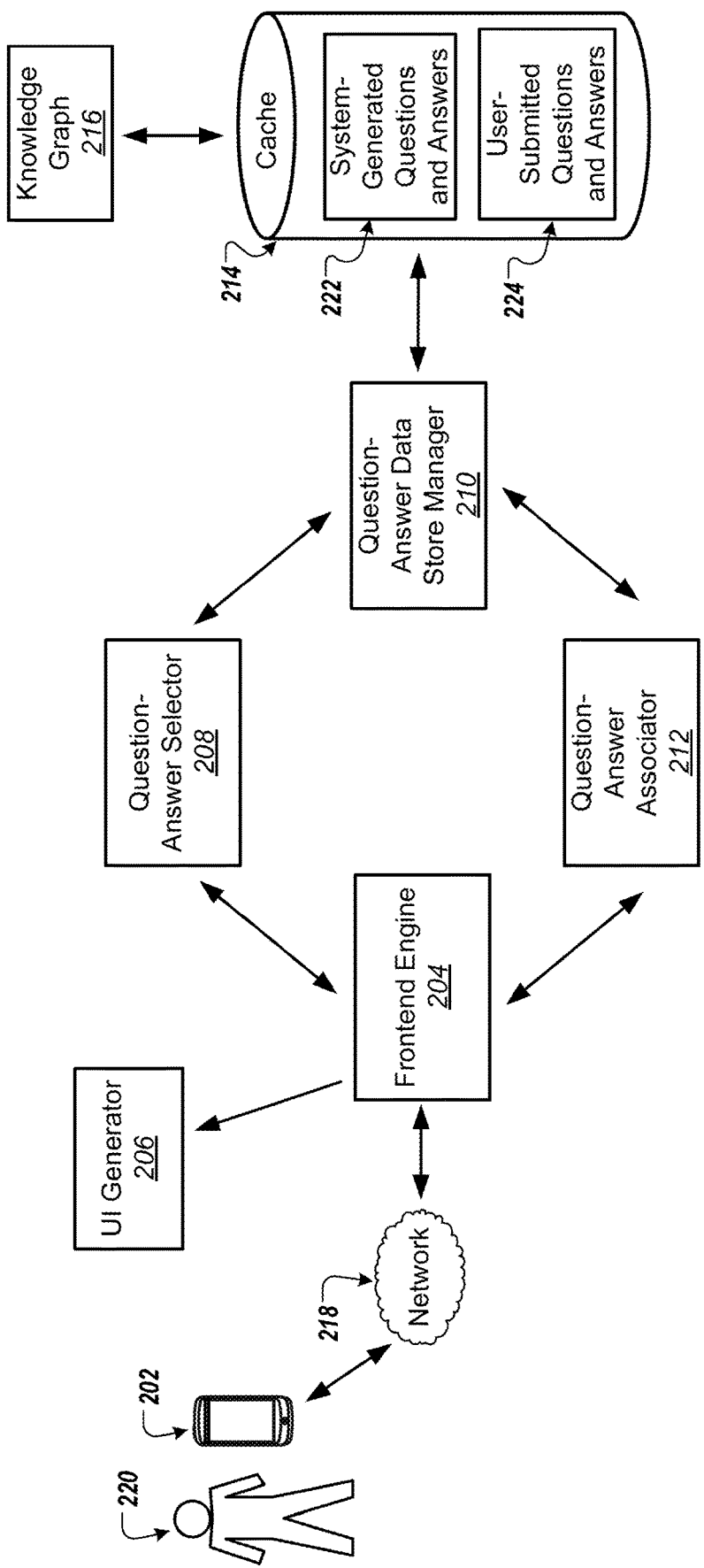
FIG. 2 depicts a system for providing the presentation page.

FIG. 2 illustrates an environment 200 for generating a presentation page, e.g., one of the presentation pages 102a-102e. The environment 200 includes a mobile computing device 202, a frontend engine 204, a UI generator 206, a question selector 208, a question-answer data store manager 210, a question-answer associator 212, a cache 214, and a knowledge graph 216. The mobile computing device 202 is in communication with the frontend engine 204 over one or more networks, e.g., the network 218. A user 220 is associated with the mobile computing device 202. The cache 214 stores question and answer data, and in particular system-generated questions and answers 222, and user-submitted questions and answers 224. In some examples, the cache 214 is in communication with the knowledge graph 216, e.g., a data structure representing i) entities—questions and answers and ii) relationships between the entities.

The frontend engine 204 receives data identifying contexts from the mobile computing device 202 over the network 218. In some examples, the context includes location-based context of the mobile computing device 202. For example, the location-based context can include GPS data, cell phone triangulation data, or other location-based data. In some examples, the context includes interest-based context of the user 220. For example, the interest-based context can include explicitly indicated context by the user 220, or inferentially determined context from an online presence of the user 220, e.g., a social networking profile.

The question selector 208 selects an initial set of questions based on the received context. Specifically, the question selector 208 receives the context-based data from the frontend engine 204. The question-answer data store manager 210 provides an interface for accessing the cache 214 by the question selector 208. In particular, the question selector 208 selects the initial set of questions stored by the cache 214 based on the received context utilizing the question-answer store manager 210.

The frontend engine 204 receives the initial set of questions from the question-answer selector 208 and provides the same to the UI generator 206. The UI generator 206 generates a respective representation of the questions of the initial set for output, and the frontend engine 204 provides the same for output to the mobile computing device 202 over the network 218. For example, the frontend engine 204 provides the presentation page 102*a* to the mobile computing device 202 including the questions 110 based on the location-based context.

The frontend engine 204 receives data indicating a selection of a particular representation associated with a particular question of the initial set of questions, e.g., from the mobile computing device 202 over the network 218. The question selector 208 selects a set of answers associated with the particular question. Specifically, the question selector 208 receives the selected-question data from the frontend engine 204. The question selector 208 selects the answers stored by the cache 214 based on the particular question utilizing the question-answer store manager 210.

The frontend engine 204 receives the set of answers from the question-answer selector 208 and provides the same to the UI generator 206. The UI generator 206 generates a respective representation of the answers of the set, and the frontend engine 204 provides the same for output to the mobile computing device 202 over the network 218. For example, the frontend engine 204 provides the presentation page 102*b* to the mobile computing device 202 including the answers 120 based on the selected question 110*a*.

In some examples, the frontend engine 204 provides a control for submission of a new answer to the mobile computing device 202 over the network 218. Specifically, the new answer is for association with a particular question of the initial set of questions. For example, the frontend engine 204 provides the presentation page 102*b* to the mobile computing device 202 including the submission region 118. Additionally, the frontend engine 204 can receive data of the new answer entered through the control from the mobile computing device 202 over the network 218. The question-answer associator 212 stores data associated the new answer with the particular question in the cache 214 utilizing the question-answer store manager 210.

The frontend engine 204 receives data indicating a selection of a particular representation associated with a particular answer of the set that are associated with the particular question, e.g., from the mobile computing device 202 over the network 218.

In some examples, the question-answer selector 208 determines that an additional set of other questions is associated with the particular answer. Specifically, the question-answer selector 208 receives the selected-answer data from the frontend engine 204. The question-answer selector 208 accesses the cache 214 and determines that the selected answer is associated with an additional set of other questions stored by the cache 214. In response to the question-answer selector 208 determining that the additional set of other questions is associated with the particular answer, the question-answer selector 208 provides the additional set of other questions to the frontend engine 204. The frontend engine 204 provides the additional set of other questions to the UI generator 206. The UI generator 206 generates a respective representation of the questions of the additional set, and the frontend engine 204 provides the same for output to the mobile computing device 202 over the network 218. For example, the frontend engine 204 provides the presentation page 102*c* to the mobile computing device 202 including the questions 126 based on the selected answer 120*c*.

In some examples, the question-answer selector 208 determines that there are no other questions associated with the particular answer. Specifically, the question-answer selector 208 receives the selected-answer data from the frontend engine 204. The question-answer selector 208 accesses the cache 214 and determines that the particular answer is not associated with other questions. In response to the question-answer selector 208 determining that there are no other questions associated with the particular answer, the frontend engine 204 provides a control for submission of a new question to the mobile computing device 202 over the network 218. For example, the frontend engine 204 provides the presentation page 102*e* to the mobile computing device 202 including the submission region 138. Additionally, the frontend engine 204 can receive data of the new question entered through the control from the mobile computing device 202 over the network 218. The question-answer associate 212 stores data associated the new question with the particular answer in the cache 214 utilizing the question-answer store manager 210.

Figure 3A:
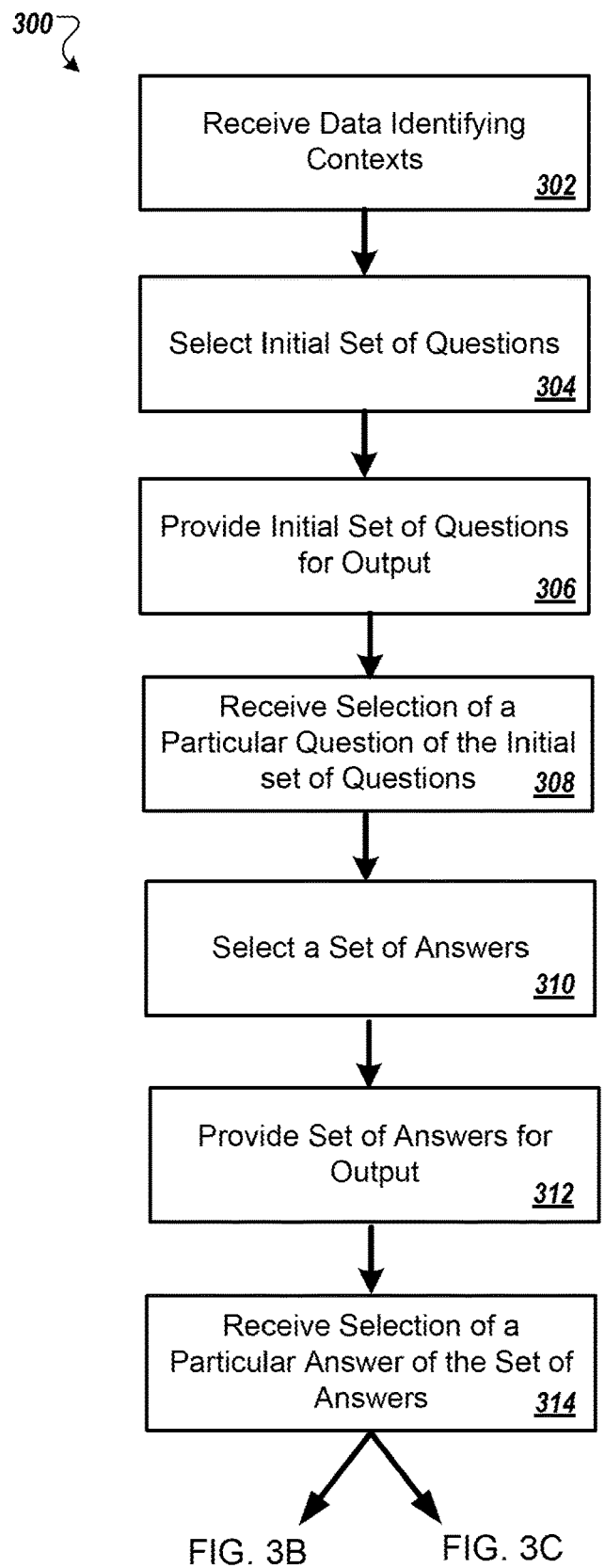
FIGS. 3A-3C depict a flowchart of an example process for providing the presentation page.
Figure 3C:
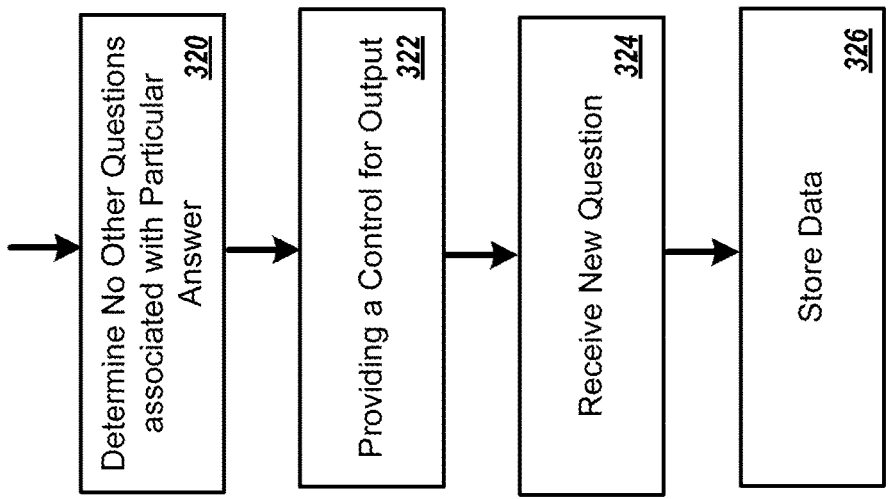
Figure 3B:
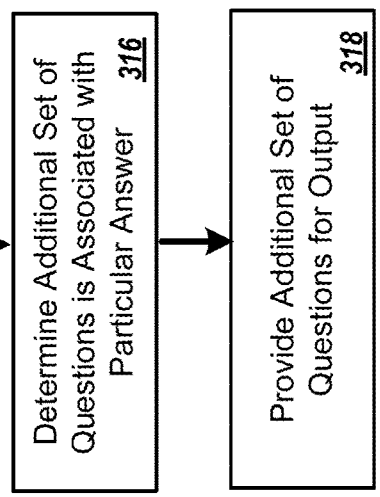

FIGS. 3A, 3B, 3C depict a flowchart of an example process 300 for generating a presentation page for suggesting questions and answers to a user. The example process 300 can be executed using one or more computing devices. For example, the mobile computing device 202, the frontend engine 204, the UI generator 206, the question selector 208, the question-answer data store manager 210, and/or the question-answer associator 212 can be used to execute the example process 300.

Data identifying one or more contexts is received (302). Specifically, the frontend engine 204 receives data identifying contexts from the mobile computing device 202 over the network 218. For example, the data identifying the contexts can include a location-based context of the mobile computing device 202 and/or the user 220. An initial set of one or more questions is selected based at least on one or more of the contexts (304). Specifically, the question selector 208 selects the initial set of questions stored by the cache 214 based on the received context utilizing the question-answer store manager 210.

A respective representation of one or more of the questions of the initial set is provided, for output (306). The UI generator 206 generates a respective representation of the questions of the initial set for output, and the frontend engine 204 provides the same for output to the mobile computing device 202 over the network 218. For example, the frontend engine 204 provides the presentation page 102*a* to the mobile computing device 202 including the questions 110 based on the location-based context.

Data indicating a selection of a particular representation associated with a particular question of the initial set of questions is received (308). Specifically, the frontend engine 204 receives data indicating a selection of a particular representation associated with a particular question of the initial set of questions, e.g., from the mobile computing device 202 over the network 218. A set of one or more answers associated with the particular question is selected (310). Specifically, the question selector 208 selects the answers stored by the cache 214 based on the particular question utilizing the question-answer store manager 210.

A respective representation of one or more of the answers of the set that are associated with the particular question is provided, for output (312). The UI generator 206 generates a respective representation of the answers of the set, and the frontend engine 204 provides the same for output to the mobile computing device 202 over the network 218. For example, the frontend engine 204 provides the presentation page 102b to the mobile computing device 202 including the answers 120 based on the selected question 110a.

Data indicating a selection of a particular representation associated with a particular answer of the set that are associated with the particular question is received (314). Specifically, the frontend engine 204 receives data indicating a selection of a particular representation associated with a particular answer of the set that are associated with the particular question, e.g., from the mobile computing device 202 over the network 218.

In some examples, an additional set of one or more other questions is determined to be associated with the particular answer (316). Specifically, the question-answer selector 208 accesses the cache 214 and determines that the selected answer is associated with an additional set of other questions stored by the cache 214. In response to determining that the additional set of one or more other questions is associated with the particular answer, a respective representation of one or more of the other questions of the additional set is provided, for output (318). Specifically, the UI generator 206 generates a respective representation of the questions of the additional set, and the frontend engine 204 provides the same for output to the mobile computing device 202 over the network 218. For example, the frontend engine 204 provides the presentation page 102c to the mobile computing device 202 including the questions 126 based on the selected answer 120c.

In some examples, no other questions are determined to be associated with the particular answer (320). Specifically, the question-answer selector 208 accesses the cache 214 and determines that the particular answer is not associated with other questions. In response to determining that no other questions are associated with the particular answer, a control for submission of a new question is provided for output (322). Specifically, the frontend engine 204 provides a control for submission of a new question to the mobile computing device 202 over the network 218. For example, the frontend engine 204 provides the presentation page 102e to the mobile computing device 202 including the submission region 138. Additionally, in response to determining that no other questions are associated with the particular answer, the new question entered through the control is received (324). Specifically, the frontend engine 204 can receive data of the new question entered through the control from the mobile computing device 202 over the network 218. Further, in response to determining that no other questions are associated with the particular answer, data associating the new question with the particular answer is stored (326). Specifically, The question-answer associate 212 stores data associated the new question with the particular answer in the cache 214 utilizing the question-answer store manager 210.

Figure 4:
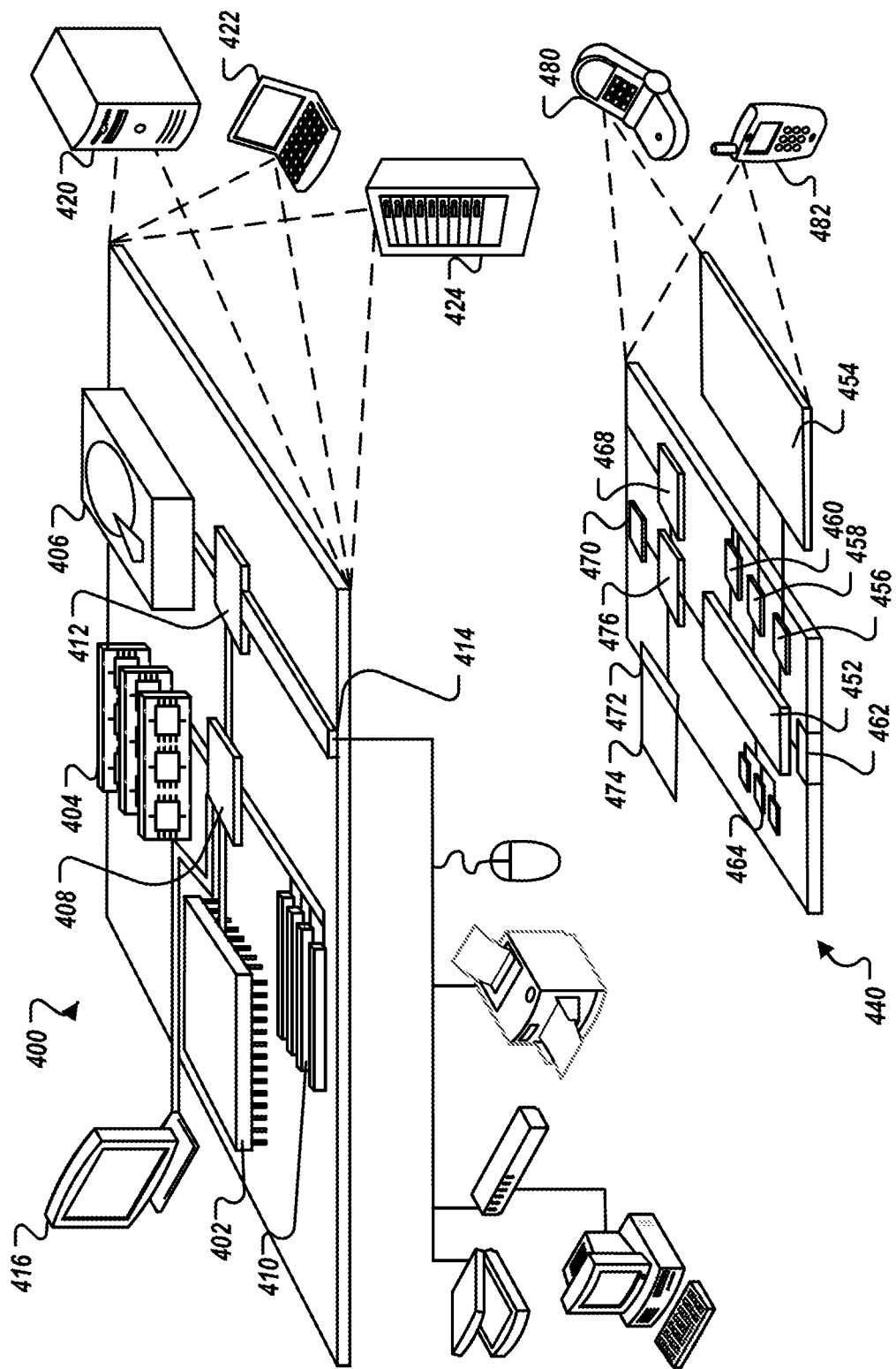
FIG. 4 depicts a flowchart of an example computing system and mobile computing device that may be used to implement the techniques described herein

FIG. 4 shows an example of a generic computer device 400 and a generic mobile computer device 440, which may be used with the techniques described here. Computing device 400 is intended to represent various forms of digital computers, such as laptops, desktops, workstations, personal digital assistants, servers, blade servers, mainframes, and other appropriate computers. Computing device 440 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter. IN some examples, the storage device 406 is coupled to a high-speed bus.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 440. Each of such devices may contain one or more of computing device 400, 440, and an entire system may be made up of multiple computing devices 400, 440 communicating with each other.

Computing device 440 includes a processor 452, memory 464, an input/output device such as a display 454, a communication interface 476, and a transceiver 468, among other components. The device 440 may also be provided with a storage device, such as a microdrive or other device, to provide additional storage. Each of the components 440, 452, 464, 454, 476, and 468, are interconnected using various buses, and several of the components may be mounted on a common motherboard or in other manners as appropriate.

The processor 452 may execute instructions within the computing device 640, including instructions stored in the memory 464. The processor may be implemented as a chipset of chips that include separate and multiple analog and digital processors. The processor may provide, for example, for coordination of the other components of the device 440, such as control of user interfaces, applications run by device 440, and wireless communication by device 440.

Processor 452 may communicate with a user through control interface 468 and display interface 446 coupled to a display 454. The display 454 may be, for example, a TFT LCD (Thin-Film-Transistor Liquid Crystal Display) or an OLED (Organic Light Emitting Diode) display, or other appropriate display technology. The display interface 446 may comprise appropriate circuitry for driving the display 454 to present graphical and other information to a user. The control interface 448 may receive commands from a user and convert them for submission to the processor 452. In addition, an external interface 462 may be provide in communication with processor 452, so as to enable near area communication of device 440 with other devices. External interface 462 may provide, for example, for wired communication in some implementations, or for wireless communication in other implementations, and multiple interfaces may also be used.

The memory 464 stores information within the computing device 440. The memory 464 may be implemented as one or more of a computer-readable medium or media, a volatile memory unit or units, or a non-volatile memory unit or units. Expansion memory 444 may also be provided and connected to device 440 through expansion interface 442, which may include, for example, a SIMM (Single In Line Memory Module) card interface. Such expansion memory 444 may provide extra storage space for device 440, or may also store applications or other information for device 440. Specifically, expansion memory 444 may include instructions to carry out or supplement the processes described above, and may include secure information also. Thus, for example, expansion memory 444 may be provide as a security module for device 440, and may be programmed with instructions that permit secure use of device 440. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 444, memory on processor 452, or a propagated signal that may be received, for example, over transceiver 468 or external interface 462.

Device 440 may communicate wirelessly through communication interface 476, which may include digital signal processing circuitry where necessary. Communication interface 476 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 440 may provide additional navigation- and location-related wireless data to device 440, which may be used as appropriate by applications running on device 440.

Device 440 may also communicate audibly using audio codec 460, which may receive spoken information from a user and convert it to usable digital information. Audio codec 460 may likewise generate audible sound for a user, such as through a speaker, e.g., in a handset of device 440. Such sound may include sound from voice telephone calls, may include recorded sound (e.g., voice messages, music files, etc.) and may also include sound generated by applications operating on device 440.

The computing device 440 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:
receiving, from a computing device, data specifying an interest-based context of a user that specifies an interest of the user, wherein the interest-based context includes a location-based context of a map location;
selecting an initial set of questions based at least on the interest of the user specified by the interest-based context, wherein the initial set of questions comprises questions previously submitted by other users for which a same interest-based context was specified for the other users that is the same as the interest-based context of the user;
for the location-based context of the map location, generating a map display region of a map that includes the map location;
generating a question display region that includes, for each question of the initial set of questions, user interface data that causes a user interface to display a respective representation of the question and a selectable interface element associated with the question;
providing, to the computing device, the generated map display region and the question display region that includes the user interface data that causes a user interface to concurrently display the map display region and the question display region that includes the respective representation of each question and each selectable interface element, for output on a user interface of the computing device;
receiving, from the computing device, data indicating a selection of a particular selectable interface element associated with a particular question of the initial set of questions;
selecting a set of answers associated with the particular question;
generating, based on the selection of the particular selectable interface element, an updated map display region of the map that includes map locations associated with the set of answers associated with the particular question;
for each answer of the set of answers, generating an answer display region that includes user interface data that causes a user interface to display a respective representation of the answer; and
providing, to the computing device, the generated updated map display region and the answer display region that includes the user interface data that causes a user interface to concurrently display the updated map display region and the answer display region that includes the respective representation of each answer that is associated with the particular question, for output on the user interface of the computing device.

2. The method of claim 1, further comprising:
receiving, from the computing device, data indicating a selection of a particular selectable interface element associated with a particular answer of the set that is associated with the particular question;
determining that an additional set of other questions is associated with the particular answer; and
in response to determining that the additional set of other questions is associated with the particular answer:
for each question of the additional set of other questions, generating user interface data that causes a user interface to display a respective representation of the question and a selectable interface element associated with the question; and providing, to the computing device, the generated user interface data that causes a user interface to display the respective representation of each question of the additional set, for output on the user interface of the computing device.

3. The method of claim 2, further comprising:
determining that no other questions are associated with the particular answer; and
in response to determining that no other questions are associated with the particular answer:
providing, to the computing device for output, a control for submission of a new question,
receiving, from the computing device, the new question entered through the control, and
storing data associating the new question with the particular answer.

4. The method of claim 1, wherein the initial set of questions are ranked based on a popularity of each of the questions.

5. The method of claim 1, wherein the set of answers are ranked based on a popularity of each of the answers.

6. The method of claim 1, wherein providing, to the computing device, the generated user interface data that causes a user interface to display the respective representation of each answer that is associated with the particular question, for output on the user interface of the computing device, further comprises:
providing, to the computing device for output, a control for submission of a new answer,
receiving, from the computing device, the new answer entered through the control, and
storing data associating the new answer with the particular question.

7. The method of claim 1, wherein:
receiving data specifying the interest-based context of the user that specifies an interest of the user comprises receiving a search query input by the user, the search query including terms that specify the interest of the user;
the search query is for a search operation, and further comprising providing, with the generated user interface data, search results that are separate from user interface data, where each search result references a resource response to the search query.

8. A system comprising:
one or more computers and one or more storage devices storing instructions that are operable, when executed by the one or more computers, to cause the one or more computers to perform operations comprising:
receiving, from a computing device, data specifying an interest-based context of a user that specifies an interest of the user, wherein the interest-based context includes a location-based context of a map location;
selecting an initial set of questions based at least on the interest of the user specified by the interest-based context, wherein the initial set of questions comprises questions previously submitted by other users for which a same interest-based context was specified for the other users that is the same as the interest-based context of the user;
for the location-based context of the map location, generating a map display region of a map that includes the map location;
generating a question display region that includes, for each question of the initial set of questions, user interface data that causes a user interface to display a respective representation of the question and a selectable interface element associated with the question;
providing, to the computing device, the generated map display region and the question display region that includes the user interface data that causes a user interface to concurrently display the map display region and the question display region that includes the respective representation of each question and each selectable interface element, for output on a user interface of the computing device;
receiving, from the computing device, data indicating a selection of a particular selectable interface element associated with a particular question of the initial set of questions;
selecting a set of answers associated with the particular question;
generating, based on the selection of the particular selectable interface element, an updated map display region of the map that includes map locations associated with the set of answers associated with the particular question;
for each answer of the set of answers, generating an answer display region that includes user interface data that causes a user interface to display a respective representation of the answer; and
providing, to the computing device, the generated updated map display region and the answer display region that includes the user interface data that causes a user interface to concurrently display the updated map display region and the answer display region that includes the respective representation of each answer that is associated with the particular question, for output on the user interface of the computing device.

9. The system of claim 8, the operations further comprising:
receiving, from the computing device, data indicating a selection of a particular selectable interface element associated with a particular answer of the set that are associated with the particular question;
determining that an additional set of other questions is associated with the particular answer; and
in response to determining that the additional set of other questions is associated with the particular answer:
for each question of the additional set of other questions, generating user interface data that causes a user interface to display a respective representation of the question and a selectable interface element associated with the question; and
providing, to the computing device, the generated user interface data that causes a user interface to display the respective representation of each question of the additional set, for output on the user interface of the computing device.

10. The system of claim 9, the operations further comprising:
determining that no other questions are associated with the particular answer; and
in response to determining that no other questions are associated with the particular answer:
providing, to the computing device for output, a control for submission of a new question,
receiving, from the computing device, the new question entered through the control, and
storing data associating the new question with the particular answer.

11. The system of claim 8, wherein the initial set of questions are ranked based on a popularity of each of the questions.

12. The system of claim 8, wherein the set of answers are ranked based on a popularity of each of the answers.

13. The system of claim 8, wherein providing, to the computing device, the generated user interface data that causes a user interface to display the respective representation of each answer that is associated with the particular question, for output on the user interface of the computing device, further comprises:
   providing, to the computing device for output, a control for submission of a new answer,
   receiving, from the computing device, the new answer entered through the control, and
   storing data associating the new answer with the particular question.

14. The system of claim 8, wherein:
   receiving data specifying the interest-based context of the user that specifies an interest of the user comprises receiving a search query input by the user, the search query including terms that specify the interest of the user; and
   the search query is for a search operation, and the operations further comprising providing, with the generated user interface data, search results that are separate from user interface data, where each search result references a resource response to the search query.

15. A non-transitory computer-readable medium storing software comprising instructions executable by one or more computers which, upon such execution, cause the one or more computers to perform operations comprising:
   receiving, from a computing device, data specifying an interest-based context of a user that specifies an interest of the user, wherein the interest-based context includes a location-based context of a map location;
   selecting an initial set of questions based at least on the interest of the user specified by the interest-based context, wherein the initial set of questions comprises questions previously submitted by other users for which a same interest-based context was specified for the other users that is the same as the interest-based context of the user;
   for the location-based context of the map location, generating a map display region of a map that includes the map location;
   generating a question display region that includes, for each question of the initial set of questions, user interface data that causes a user interface to display a respective representation of the question and a selectable interface element associated with the question;
   providing, to the computing device, the generated map display region and the question display region that includes the user interface data that causes a user interface to concurrently display the map display region and the question display region that includes the respective representation of each question and each selectable interface element, for output on a user interface of the computing device;
   receiving, from the computing device, data indicating a selection of a particular selectable interface element associated with a particular question of the initial set of questions;
   selecting a set of answers associated with the particular question;
   generating, based on the selection of the particular selectable interface element, an updated map display region of the map that includes map locations associated with the set of answers associated with the particular question;
   for each answer of the set of answers, generating an answer display region that includes user interface data that causes a user interface to display a respective representation of the answer; and
   providing, to the computing device, the generated updated map display region and the answer display region that includes the user interface data that causes a user interface to concurrently display the updated map display region and the answer display region that includes the respective representation of each answer that is associated with the particular question, for output on the user interface of the computing device.

16. The non-transitory computer-readable medium of claim 15, wherein:
   receiving data specifying the interest-based context of the user that specifies an interest of the user comprises receiving a search query input by the user, the search query including terms that specify the interest of the user; and
   the search query is for a search operation, and the operations further comprising providing, with the generated user interface data, search results that are separate from user interface data, where each search result references a resource response to the search query.

* * * * *